US010778600B2

(12) United States Patent
Le et al.

(10) Patent No.: US 10,778,600 B2
(45) Date of Patent: Sep. 15, 2020

(54) ADAPTIVE WORKLOAD DISTRIBUTION FOR NETWORK OF VIDEO PROCESSORS

(71) Applicant: INTEL CORPORATION, Santa Clara, CA (US)

(72) Inventors: Huifeng Le, Shanghai (CN); Wenjian Shao, Shanghai (CN); Yu Zhang, Beijing (CN); Shao-Wen Yang, San Jose, CA (US); Heng Juen Han, Penang (MY); Xiaowen Zhang, Hangzhou (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/073,683

(22) PCT Filed: Mar. 30, 2016

(86) PCT No.: PCT/CN2016/077856
§ 371 (c)(1),
(2) Date: Jul. 27, 2018

(87) PCT Pub. No.: WO2017/166119
PCT Pub. Date: Oct. 5, 2017

(65) Prior Publication Data
US 2019/0036836 A1    Jan. 31, 2019

(51) Int. Cl.
*H04L 12/911* (2013.01)
*H04N 7/18* (2006.01)
(Continued)

(52) U.S. Cl.
CPC .............. *H04L 47/70* (2013.01); *H04L 29/08* (2013.01); *H04L 43/16* (2013.01); *H04L 67/025* (2013.01);
(Continued)

(58) Field of Classification Search
None
See application file for complete search history.

(56) References Cited

U.S. PATENT DOCUMENTS

| 2007/0016560 | A1  | 1/2007 | Gu et al. |
| 2007/0220516 | A1* | 9/2007 | Ishiguro ................. G06F 9/505 718/101 |

(Continued)

FOREIGN PATENT DOCUMENTS

| CN | 101557344 | 10/2009 |
| CN | 103236168 | 8/2013 |

(Continued)

OTHER PUBLICATIONS

International Search Report for International Patent Application No. PCT/CN2016/077856, dated Jan. 11, 2017, 4 pages.

(Continued)

*Primary Examiner* — Joshua Joo
(74) *Attorney, Agent, or Firm* — Finch & Maloney PLLC

(57) ABSTRACT

Techniques are provided for adaptive distribution of video analysis workload over a network of video processor nodes. The nodes may include, for example, internet protocol (IP) cameras, video recorders and/or data centers. The network may also include a management system configured to assign video analysis tasks to the nodes based on the node resources and predictive modelling of the node workload. The management system may re-distribute the tasks based on performance monitoring. Some assigned tasks may be bound to the node while other tasks may be transferrable, by the node, to other nodes. The nodes may be configured to determine which of the transferrable tasks will be locally executed or transferred based on a check of resource usage against a usage policy that specifies thresholds for the determinations. The nodes may be configured to transmit video analysis (Continued)

packets, including image data, analysis completion status and analysis results, to other nodes.

20 Claims, 10 Drawing Sheets

(51) Int. Cl.
    *H04L 29/08* (2006.01)
    *H04L 12/26* (2006.01)

(52) U.S. Cl.
    CPC .......... *H04L 67/10* (2013.01); *H04L 67/1002* (2013.01); *H04L 67/22* (2013.01); *H04N 7/181* (2013.01)

(56) References Cited

U.S. PATENT DOCUMENTS

| | | | | |
|---|---|---|---|---|
| 2010/0251258 | A1* | 9/2010 | Hanamori | G06F 9/5088 718/105 |
| 2011/0307903 | A1* | 12/2011 | Vaddagiri | G06F 9/5088 718/105 |
| 2014/0025828 | A1* | 1/2014 | Li | G06F 9/505 709/226 |
| 2015/0022666 | A1* | 1/2015 | Kay | H04L 67/025 348/159 |
| 2015/0052531 | A1* | 2/2015 | Helak | G06F 9/4856 718/102 |
| 2015/0113320 | A1* | 4/2015 | Honma | G06F 11/2023 714/13 |
| 2015/0199214 | A1* | 7/2015 | Lee | G06F 9/505 718/102 |
| 2016/0004564 | A1* | 1/2016 | Park | G06F 9/4868 718/104 |
| 2016/0004906 | A1* | 1/2016 | Nerayoff | H04N 7/181 382/103 |
| 2016/0088045 | A1* | 3/2016 | Sharma | H04L 65/1066 709/229 |
| 2016/0132414 | A1* | 5/2016 | Cho | G06F 11/263 714/28 |
| 2016/0275642 | A1* | 9/2016 | Abeykoon | G06K 9/00711 |

FOREIGN PATENT DOCUMENTS

| | | |
|---|---|---|
| CN | 104284141 | 1/2015 |
| CN | 104850576 | 8/2015 |
| CN | 105025099 | 11/2015 |

OTHER PUBLICATIONS

International Written Opinion of the International Searching Authority for International Patent Application No. PCT/CN2016/077856, dated Jan. 11, 2017, 4 pages.

International Publication for International Patent Application No. PCT/CN2016/077856, WO2017/166119, published Oct. 5, 2017, 39 pages.

International Preliminary Report on Patentability from the International Bureau for International Patent Application No. PCT/CN2016/077856 dated Oct. 11, 2018, 6 pages.

\* cited by examiner

Video Analysis
Packet
220

ADAPTIVE WORKLOAD DISTRIBUTION FOR NETWORK OF VIDEO PROCESSORS

BACKGROUND

In distributed video processing applications, such as, for example, a network of intelligent video surveillance devices, the processing workload may vary significantly during any given time period. Over the course of a day, for example, a traffic surveillance system will typically experience rush hour peaks and nighttime lulls. Additionally, accidents or other unpredictable events may occur at any time and impact processing workload. Each component or processing node of an end-to-end video system is typically assigned a fixed set of video analysis tasks to be performed. To ensure that the system can keep up with a desired level of real-time performance, the processing nodes of an end-to-end video system are generally designed with computational capabilities and resources sufficient to meet peak demand. Such an approach, however, can be expensive and inefficient.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Although the following Detailed Description will proceed with reference being made to illustrative embodiments, many alternatives, modifications, and variations thereof will be apparent to those skilled in the art.

DETAILED DESCRIPTION

Generally, this disclosure provides techniques for adaptive distribution of video analysis workload over a network of video processor nodes, or so-called end-to-end video system. The nodes may include, for example, internet protocol (IP) cameras, video recorders and/or data centers. The network may also include a management system configured to assign video analysis tasks to the nodes based on the computational resources available to the node and/or based on predictive modelling of the node workload over a selected period of time. The predictive modelling may be based, for example, on characteristics of the location or environment of the node. The management system may also be configured to re-distribute the tasks based on real-time performance monitoring of the nodes, to handle unanticipated overflow or congestion situations. Some of the assigned tasks may be specified as being bound to the node (e.g., required to be performed on that node) while other tasks may be specified as being transferrable, by the node, to other nodes. In some such embodiments, each video processor node may be configured to determine which of the transferrable tasks will be locally executed or transferred based on a check of that node's resource usage against a usage policy that specifies thresholds for such determination. Each such node may be further configured to transmit video analysis packets to facilitate the transfer of tasks to other nodes. In some such embodiments, the video analysis packets may include image data, analysis completion status and analysis results. As will be further appreciated in light of this disclosure, the techniques provided herein can be implemented in hardware or software or a combination thereof, and may be adapted into any number of applications where video analysis tasks are distributed over a network of processing nodes.

Figure 1:
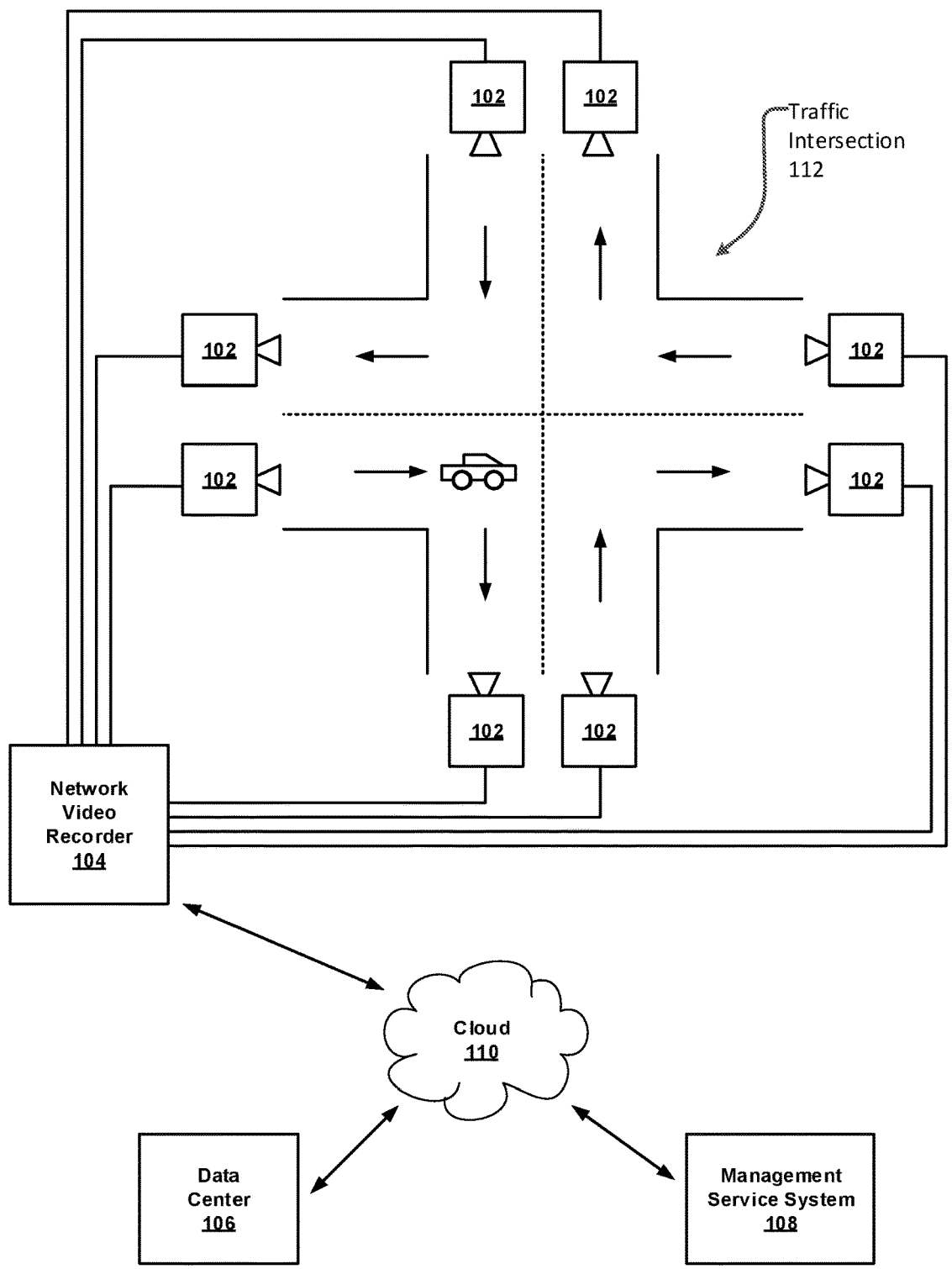
FIG. 1 is a top level diagram of a network of video processor nodes in an example application, in accordance with certain of the embodiments disclosed herein.

FIG. 1 is a top level diagram of a network 100 of video processor nodes in an example application for traffic surveillance, in accordance with certain of the embodiments disclosed herein. The network 100 is shown to include an array of IP cameras 102 configured to monitor traffic in all directions at an intersection 112. The IP cameras 102 are video processing nodes of the network and are configured to capture images and perform one or more initial video analysis (VA) tasks on those images. The IP cameras 102 are sometimes referred to as edge nodes of the network 100. The network 100 is also shown to include one or more video recorders (including Network Video Recorders or NVRs) 104 which may be configured as a gateway node between the IP cameras and the cloud 110 or other internet-based resource sharing mechanisms. The network video recorders also serve as video processing nodes configured to perform additional VA tasks on the images. The network 100 is also shown to include one or more data centers or centralized servers 106 which may be configured to communicate with NVRs 104 deployed at various locations and perform additional or final VA tasks on the images received from the NVRs. The data centers 106 are also referred to as video processing nodes. Typically, the NVRs are equipped with greater processing resources than the IP cameras, and the data centers 106 are equipped with still greater processing resources than the NVRs, although this need not be the case.

The network 100 is also shown to include a management service system 108 which may be configured to communicate with the video processing nodes (data centers 106, NVRs 104 and IP cameras 102). This communication may occur, for example, through the cloud 110 or other suitable internet or networking mechanisms. The management service system 108 may be configured to provide initial VA task assignments to the nodes (102, 104, 106), based on predictive workload modelling, and to adaptively update or re-distribute those task assignments based on workload monitoring. Additionally, the nodes may be configured to handoff a subset of their assigned VA tasks to other nodes based on workload and other factors, as will be described in greater detail below.

Figure 2:
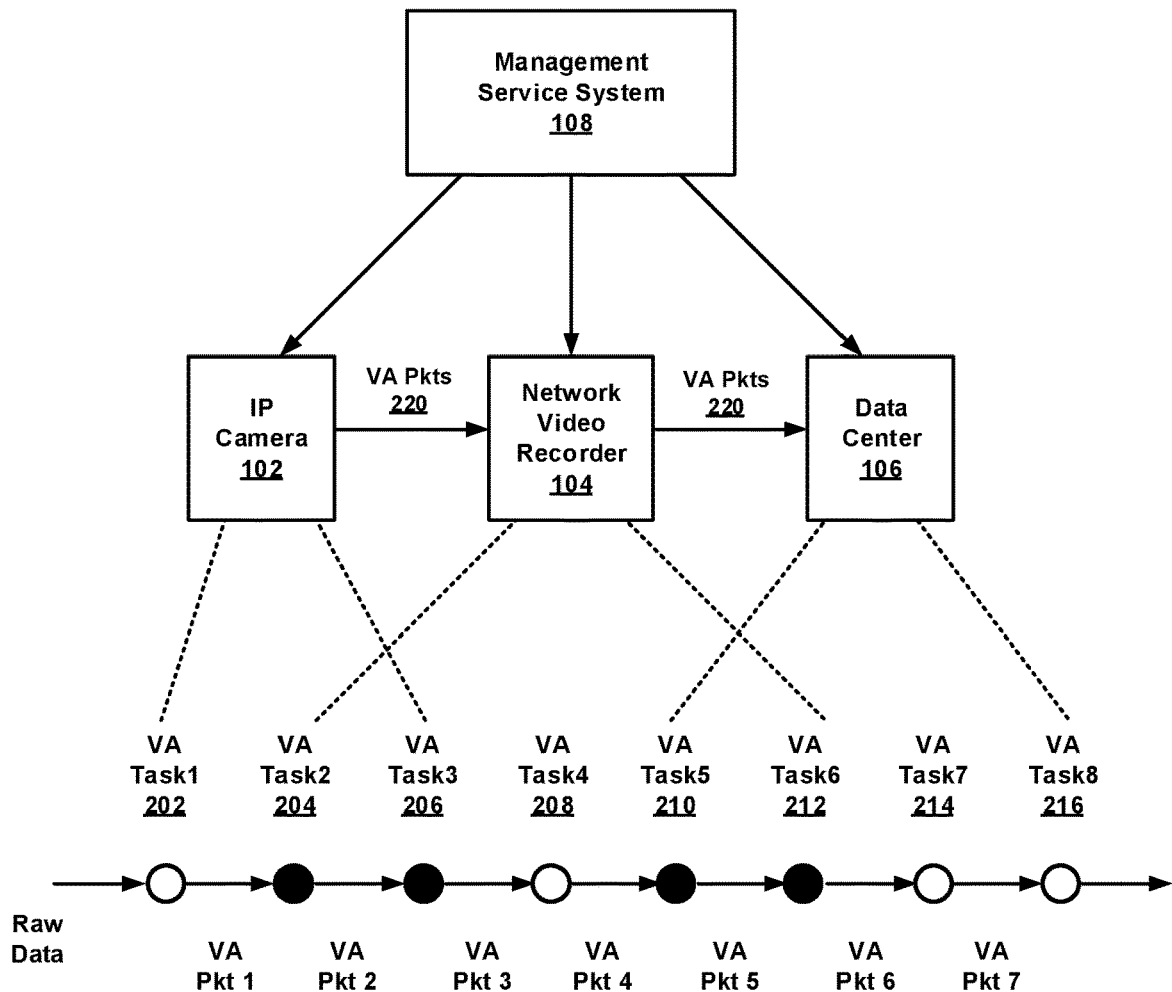
FIG. 2 is a diagram illustrating the distribution of tasks between video processor nodes in a video analysis pipeline, in accordance with certain of the embodiments disclosed herein.

FIG. 2 is a diagram illustrating the distribution of tasks between video processor nodes in a video analysis pipeline 200, in accordance with certain of the embodiments disclosed herein. The pipeline in this example is shared by three nodes: an IP camera 102, an NVR 104 and a data center 106. The pipeline begins with raw image data captured by the camera component of IP camera node 102. In this example, node 102 has been assigned the first three VA tasks (202, 204, 206) in the pipeline, to be performed sequentially on the raw data. The first VA task 202 is bound to node 102. In other words, node 102 is required to perform task 202. The second and third VA tasks (204, 206), however, are optional for node 102. In other words, these tasks are eligible to be transferred or handed off to another node in a different region of the network (e.g., the NVR 104) if node 102 becomes too busy to handle those tasks in an acceptable timeframe. The task assignments may be generated by management service system 108.

Similarly, in this example, node 104 has been assigned the potential responsibility for VA tasks 2 through 6, (204, 206, 208, 210, 212). VA tasks 204 and 206 may be performed by node 104 if they are transferred from node 102. VA task 208 is bound to node 104, while VA tasks 210 and 212 are optional for node 104 (e.g., eligible to be transferred to node 106 if workload conditions warrant a handoff). Similarly, node 106 has been assigned the potential responsibility for VA tasks 5 through 8, (210, 212, 214, 216). VA tasks 210 and 212 may be performed by node 106 if they are transferred from node 104. VA tasks 214 and 216 are bound to node 106.

One example of possible types of video analysis tasks, in the context of a traffic surveillance application, include the following: VA 1—detecting the presence of a vehicle in the intersection; VA 2—calculating the speed of the vehicle; VA 3—detecting a license plate on the vehicle; VA 4—recognizing the license plate; VA 5—classifying the type of the vehicle; VA 6—recognizing the color of the vehicle; VA 7—detecting a face of a driver of the vehicle; and VA 8—recognizing the face of the driver. VA tasks may, of course, be different in other applications. For example, in a crowd surveillance application, the VA tasks may include detecting the presence of a crowd, detecting faces of people in the crowd, and recognizing those faces.

Figure 3:
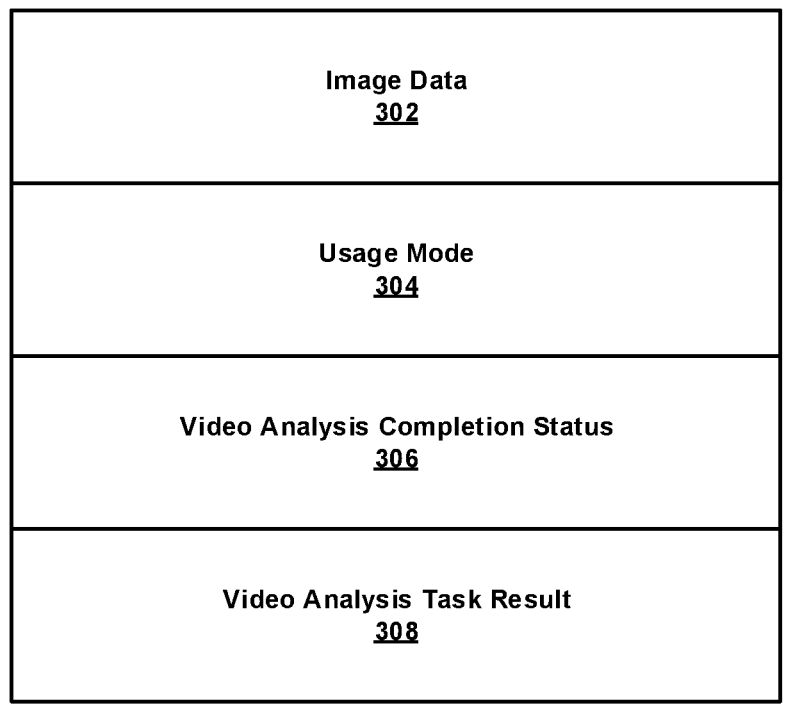
FIG. 3 is a diagram illustrating a video analysis packet, configured in accordance with certain of the embodiments disclosed herein.

In some embodiments video analysis packets 220 may be generated to describe and encapsulate the current status of the video analysis in the pipeline. This may be particularly useful when transferring VA tasks between nodes, although it may also be used in association with the progression from one task to the next within a given node. An example video analysis packet 220, configured in accordance with certain of the embodiments disclosed herein, is illustrated in FIG. 3. Four fields are shown in this example packet. Image data 302, upon which the VA task is to be performed, is provided in the first field. This may be raw image data (e.g., from a camera) or processed image data (e.g., the result of previous VA tasks) or any combination thereof. A usage mode 304 is provided in the second field and may be employed to indicate the type of video processing application that is being performed (e.g., traffic surveillance, crowd surveillance, etc.). In some embodiments, multiple pipelines may be implemented and each pipeline may define an associated usage mode. For example, one pipeline may be associated with traffic surveillance or the identification of features of a vehicle, while another pipeline may be associated with crowd surveillance or identification of features of a person. In some embodiments, usage mode information may impact some aspect of the execution of the VA tasks. A video analysis completion status 306 is provided in the third field, which may be used to indicate which VA tasks in the pipeline have been completed at that point and enable the recipient of the packet to determine which VA task needs to be performed next. A video analysis task result 308 is provided in the fourth field to provide the result of one or more, or all, previous video analysis tasks in the pipeline to have been performed at that point.

Figure 4:
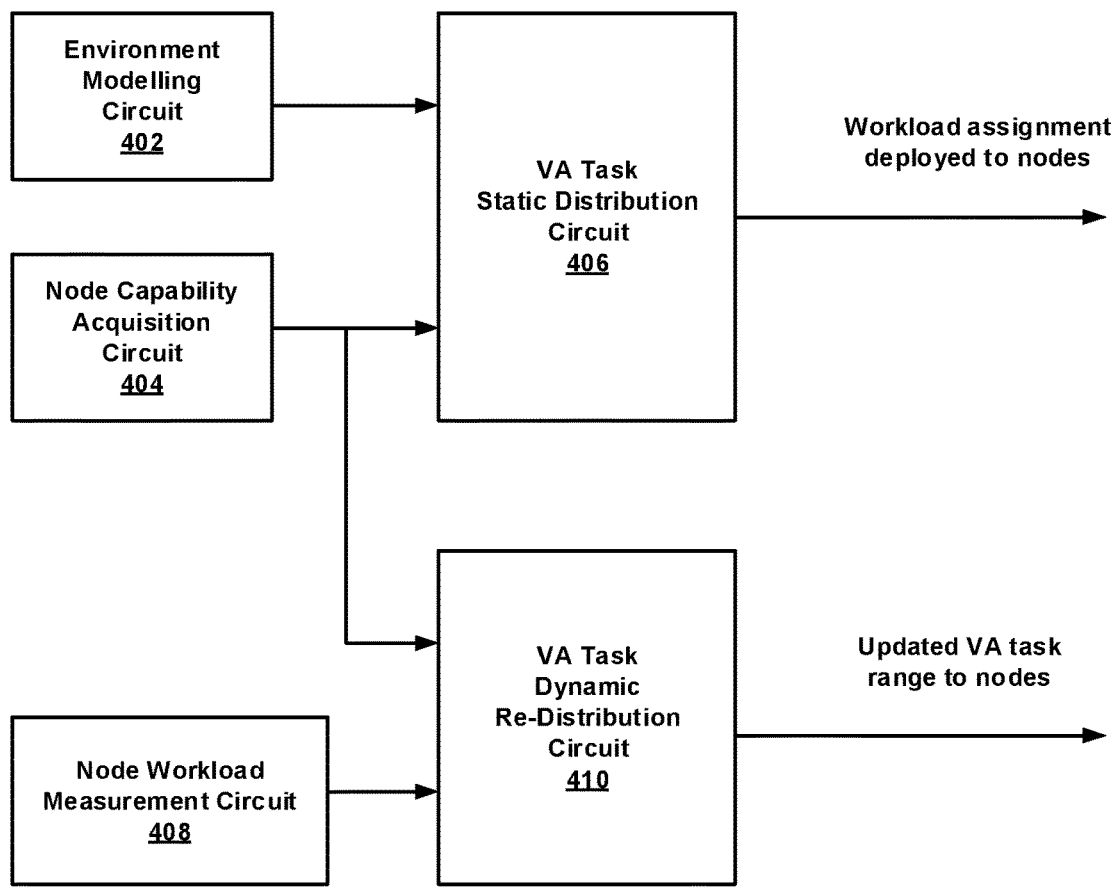
FIG. 4 is a block diagram of a management service system, configured in accordance with certain of the embodiments disclosed herein.

FIG. 4 is a block diagram of a management service system 108, configured in accordance with certain of the embodiments disclosed herein. The management service system 108 is shown to include an environment modelling circuit 402, a node capability acquisition circuit 404, a VA task static distribution circuit 406, a node workload measurement circuit 408 and a VA task dynamic re-distribution circuit 410.

The environment modelling circuit 402 may be configured to predict the workload of the nodes to which VA tasks will be assigned, during a selected time period. For example, circuit 402 may predict the workload of each node or groups of nodes over the course of a 24 hour day based on statistics or other information about the environment in which the nodes operate. In a traffic surveillance application, for example, there may be known peak periods during rush hour and known idle periods during late night hours. Other periodic patterns may also be exploited depending on the specific locations of the nodes and the associated environment. Other predictable patterns may be based on more general knowledge such as the occurrence of a weekday, weekend, or holiday period, as well as the season and/or the expected weather, etc.

The node capability acquisition circuit 404 may be configured to determine the computational resources available at each node or class of nodes. Computational resources may include processor speed, memory capacity, network connection speed, and/or any other suitable processing metric that may be associated with a node and impact the performance of VA tasks. In some embodiments, the node capability acquisition circuit 404 may be configured to determine the computational resources through communication with the nodes (e.g., self-reporting of the nodes). In some embodiments, the computational resources may be determined through consultation of a database or based on information provided by a user or system administrator, for example during configuration of the network.

The VA task static distribution circuit 406 may be configured to identify the VA tasks that need to be performed by the processing nodes for a particular application. The VA task static distribution circuit 406 may further be configured to generate an initial assignment of some or all of those tasks to each node or group of nodes. The initial assignment may include a first subset of the VA tasks that are required to be performed by the assigned node and a second subset of the VA tasks that are permitted to be transferred from the assigned node to another of the video processing nodes. The initial assignment may be based on the predicted workload of the node and/or the determined computational resources of the node.

The node workload measurement circuit 408 may be configured to monitor workload of the video processing nodes, for example in real-time, as they perform the assigned VA tasks. The VA task dynamic re-distribution circuit 410 may be configured to update the assignments of the VA tasks to the nodes based on the monitored workload.

Dynamic redistribution enables the system to adapt to unpredictable workload variations or bursts that may occur, for example, when an accident or other such event takes place. The update may include an increase or decrease in the number of VA tasks assigned to the node, or a change in the requirements that certain of the VA tasks be performed at that node versus being eligible for a transfer to another node.

In some embodiments, the task assignments may include algorithms or other information associated with the performance of each assigned task. The update of task assignments may thus include a change of the algorithm to be used for the assigned task. For example, in response to an increase in the workload of a node, an existing task algorithm may be substituted with a less computationally intensive algorithm, trading off quality or accuracy of the results for the ability to keep up with real-time processing requirements. In some embodiments, additional processing may be performed at a later time, to restore quality, either when the workload at the node has decreased, or when another node can perform that processing.

Figure 5:
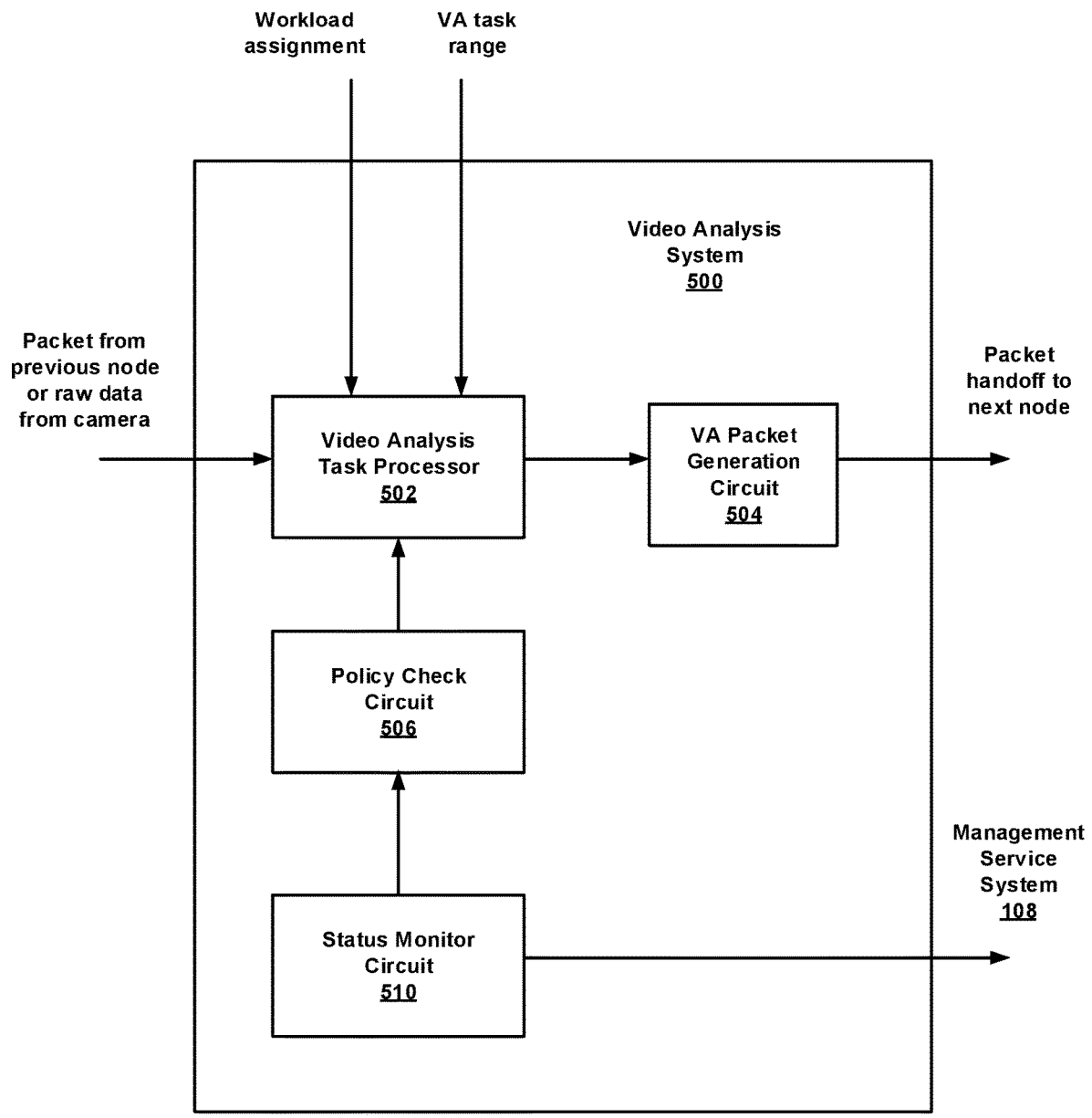
FIG. 5 is a block diagram of a video processing node, configured in accordance with certain of the embodiments disclosed herein.

FIG. 5 is a block diagram of a video processing node, configured in accordance with certain of the embodiments disclosed herein. The video processing node may be one of, for example, an IP camera 102, an NVR 104 or a data center 106. The video processing nodes are shown to include a video analysis task processor 502, a VA packet generation circuit 504, a policy check circuit 506 and a status monitor circuit 510.

The video analysis task processor 502 may be configured to receive a workload assignment including a VA task list, for example from the management service system 108. The task list may comprise any combination of required VA tasks, which should be performed by the node to which they are assigned, as well as optional VA tasks that may be transferred to another node under certain circumstances. In some embodiments, the task list may specify a first range or subset of tasks that are required and a second range of tasks that are optional. The video analysis task processor 502 is also configured to perform or execute those VA tasks. The VA tasks may operate on raw image data from the camera (e.g., provided by an IP camera node) or on processed image data generated from the performance of a prior VA task, either on that node or another node.

The policy check circuit 506 may be configured to check the resource usage of the processing node against a usage policy. The usage policy may specify one or more resource usage thresholds for determination of further VA task processing by the node, as will be described in greater detail below. In other words, the VA task processor 502 may be configured to either perform or hand off one or more of the optional VA tasks based on the resource usage check. In some embodiments, the usage policy may be provided by the management service system 108.

The VA packet generation circuit 504 may be configured to generate a VA packet comprising image data, a usage mode, a VA completion status and a VA task result, as described previously. In some embodiments, the VA packet generation circuit 504 may be configured to transfer the packet using an independent networking protocol (e.g., Message Queuing Telemetry Transport (MQTT)) or to include or encapsulate the packet in a video streaming format (e.g., Motion Picture Experts Group Transport Stream (MPEG-TS)). The VA packet may be transmitted to another processing node in connection with a VA task handoff. The status monitor circuit 510 may be configured to monitor the resource usage of the processing node, for example in real-time, and provide those results to the policy check circuit 506 and/or to the management service system 108.

Figure 6:
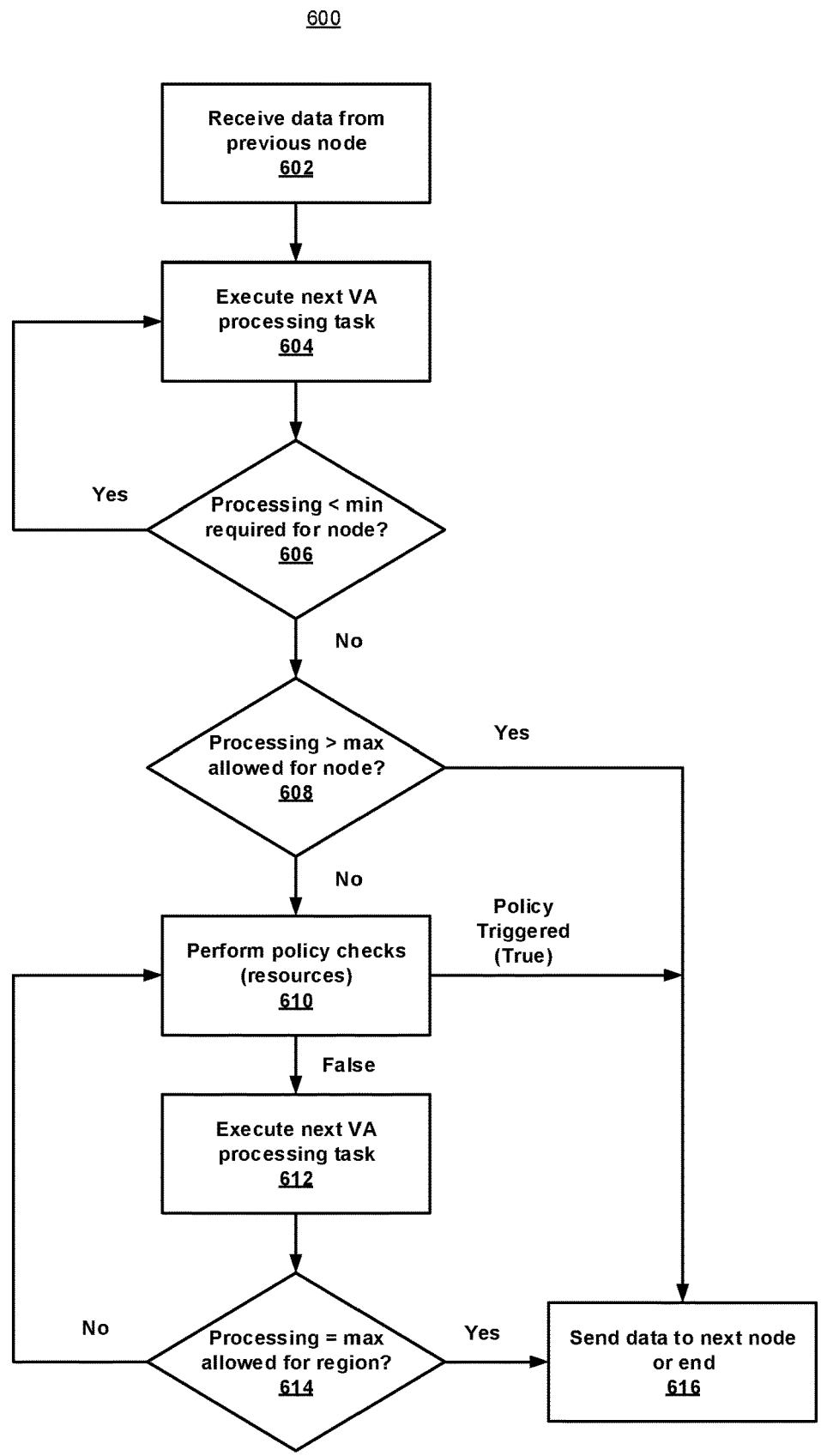
FIG. 6 is a flowchart illustrating a methodology for video analysis task execution, in accordance with certain of the embodiments disclosed herein.

FIG. 6 is a flowchart illustrating a methodology 600 for video analysis task execution, in accordance with certain of the embodiments disclosed herein. Video analysis system 500 may be configured to implement this methodology to execute or transfer VA tasks based on a check of resource usage against a usage policy to improve real-time performance. At operation 602, the VA system 500 of a processing node 102, 104, 106 receives data from a previous node in the pipeline 200. The data may be encapsulated in a VA packet 220. At operation 604, the VA system executes the next VA processing task from the assigned task list. At operation 606, if the processing of tasks has not yet exceeded the minimum requirements for that node (e.g., the required VA tasks), execution loops back to operation 604 where the next VA task is performed. Otherwise, at operation 608, a check is performed to determine if all the required and optional tasks for that node have been performed. If so, then the data (e.g., results of processing to that point in the form of a VA packet 220) are either sent to the next node in the pipeline, at operation 616, or the process terminates if all VA processing has been completed. Otherwise, at operation 610, a resource policy check is performed, as described in greater detail below, to determine if a task transfer policy has been triggered. If so, then the process continues at operation 616 and data is sent to the next node. Otherwise, at operation 612, the next VA processing task is executed. At operation 614, if the processing of tasks has not yet exceeded a maximum processing specified for the region in which that node is located (e.g., edge, gateway, etc.), execution loops back to operation 610 where the policy check repeated. Otherwise, the process continues at operation 616 and data is sent to the next node.

Figure 7:
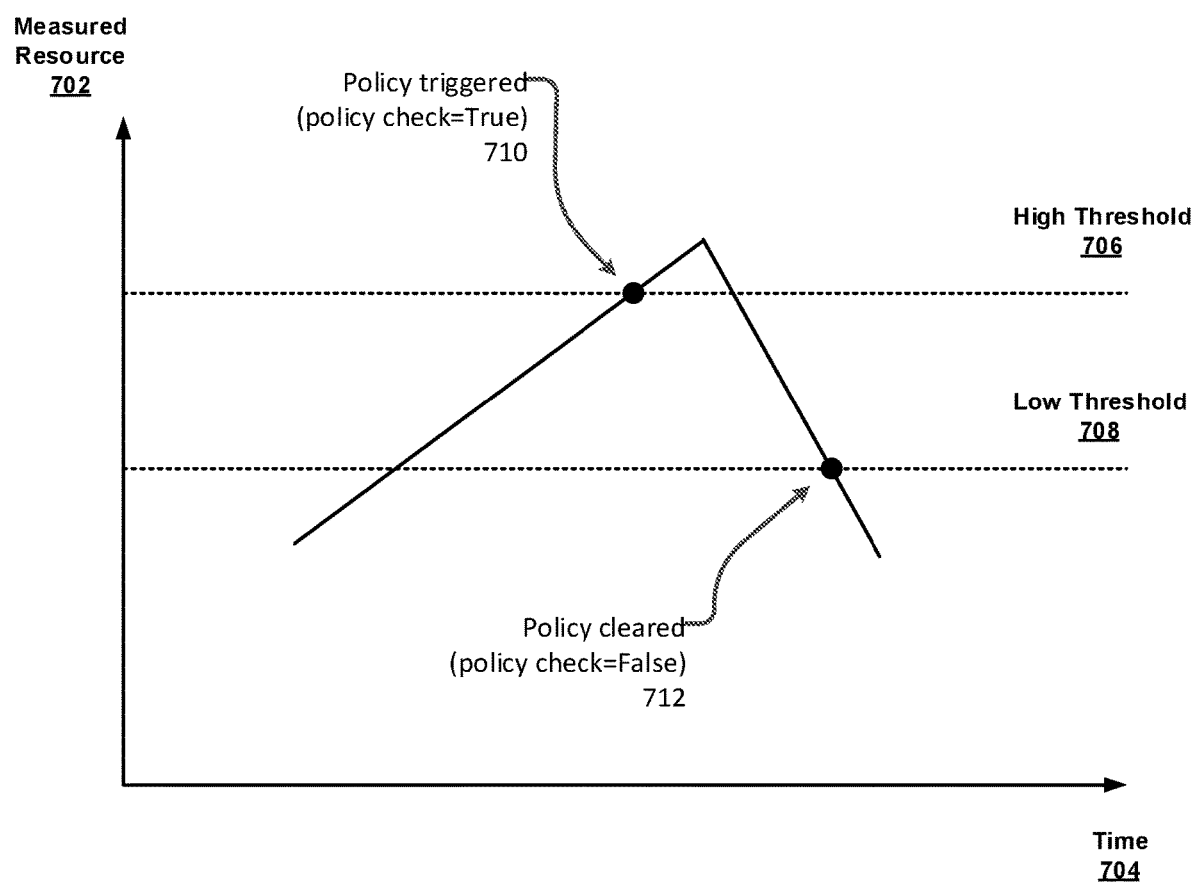
FIG. 7 is a graph illustrating the application of policy checks, in accordance with certain of the embodiments disclosed herein.

FIG. 7 is a graph 700 illustrating the application of policy checks, in accordance with certain of the embodiments disclosed herein. One measured resource 702 of the node is plotted over time 704. Resources may include, for example processor utilization, memory consumption, network traffic, etc. In some embodiments, the resources may be measured by status monitor circuit 510. Two thresholds, a high threshold level 706 and a low threshold level 708, are shown on the plot. Different threshold levels may be provided for each node resource. For example, the high threshold level for processor utilization may be 80% while the low threshold level may be 60%. Other thresholds may be more suitable for memory consumption, or other resources. If the measured resource exceeds the high threshold level, the policy is triggered 710 (e.g., a policy check will return True) indicating that optional tasks will be handed off to another node. Once the policy is triggered, it may remain in that state until the measured resource falls back below the low threshold 708, at which point the policy may be cleared 712, indicating that optional tasks will no longer be transferred to other nodes. The use of two thresholds may increase stability of the system by avoiding frequent re-adjustment of workload processing when resources measurement values would otherwise be fluctuating around a single threshold value.

In some embodiments, the policy may be triggered when any one of the measured resources exceeds the high level threshold. In some embodiments, the policy may be triggered based on a combination of multiple resource measurement threshold crossings. The combination may be a weighted combination to reflect a relative importance of the different resources.

Methodology

Figure 8:
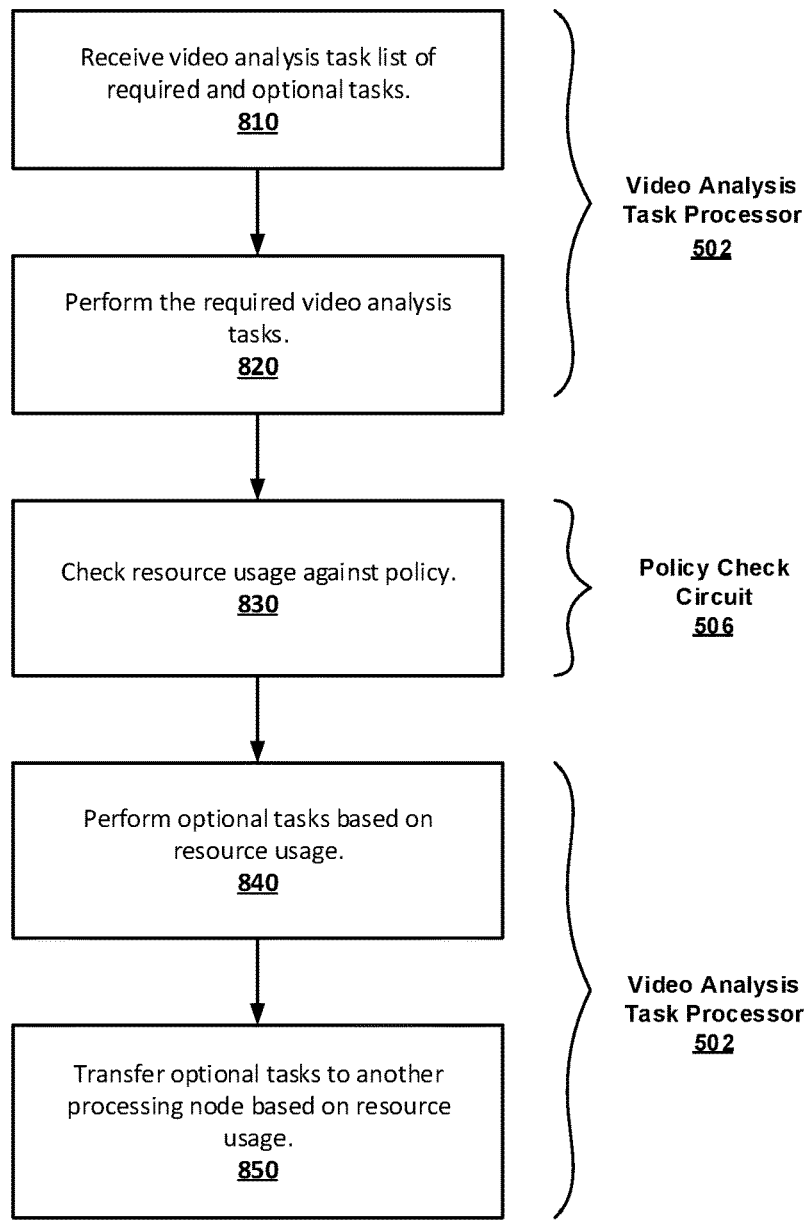
FIG. 8 is a flowchart illustrating another methodology for video analysis task execution, in accordance with certain of the embodiments disclosed herein.

FIG. 8 is a flowchart illustrating an example method 800 for video analysis task execution, in accordance with an embodiment of the present disclosure. As can be seen, example method 800 includes a number of phases and sub-processes, the sequence of which may vary from one embodiment to another. However, when considered in the aggregate, these phases and sub-processes form a process for the execution and/or transfer of video analysis tasks based on a check of resource usage against a usage policy in accordance with certain of the embodiments disclosed herein. These embodiments can be implemented, for example using the system architecture illustrated in FIG. 5 for a video processing node 102, 104 or 106, as described above. However other system architectures can be used in other embodiments, as will be apparent in light of this disclosure. To this end, the correlation of the various functions shown in FIG. 8 to the specific components illustrated in FIG. 5 is not intended to imply any structural and/or use limitations. Rather other embodiments may include, for example, varying degrees of integration wherein multiple functionalities are effectively performed by one system. For example, in an alternative embodiment a single module can be used to perform all of the functions of method 800. Thus other embodiments may have fewer or more modules and/or sub-modules depending on the granularity of implementation. Numerous variations and alternative configurations will be apparent in light of this disclosure.

As illustrated in FIG. 8, in one embodiment, method 800 for video analysis task execution commences, at operation 810, by receiving a video analysis (VA) task list at a VA processing node. In some embodiments, the task list includes required VA tasks and optional VA tasks. The required VA tasks are bound to the processing node while the optional VA tasks may be transferred from the VA node to another VA node, as explained below.

Next, at operation 820, one or more of the required VA tasks are performed or executed by the processing node. At operation 830, the resource usage of the processing node is checked against a usage policy that specifies usage resource threshold values for the determination of further task processing versus possible task transfers to other nodes. In some embodiments, resource usage includes processor utilization and memory consumption. In some embodiments, the usage policy may include a first threshold value associated with triggering the transfer of the optional VA tasks to other nodes, and a second threshold value associated with ending the transfer of the optional VA tasks.

At operation 840, one or more of the optional VA tasks are performed or executed by the processing node based on the resource usage check. At operation 850, one or more of the optional VA tasks are transferred to another processing node based on the resource usage check.

Of course, in some embodiments, additional operations may be performed, as previously described in connection with the system. These additional operations may include, for example, generating a VA packet that includes image data, a VA completion status and a VA task result, for transmission to another VA processing node in connection with the transfer of optional VA tasks. Further additional operations may include, for example, adding a usage mode field to the VA packet to specify the type of video analysis to be performed. Types of video analysis may include, for example, identifying features of a vehicle or a person.

Figure 9:
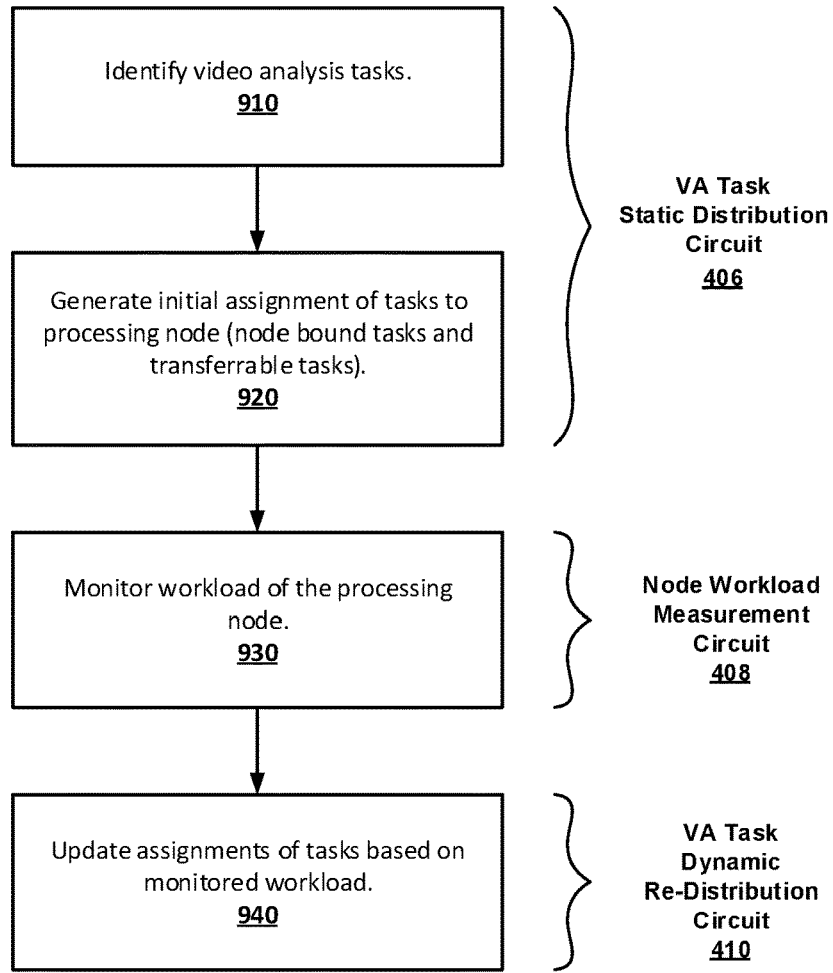
FIG. 9 is a flowchart illustrating a methodology for video analysis task distribution, in accordance with certain of the embodiments disclosed herein.

FIG. 9 is a flowchart illustrating an example method 900 for video analysis task distribution, in accordance with certain of the embodiments disclosed herein. As can be seen, example method 900 also includes a number of phases and sub-processes, the sequence of which may vary from one embodiment to another. These embodiments can be implemented, for example using the system architecture illustrated in FIG. 4 for a management service system 108, as described above. However other system architectures can be used in other embodiments, as will be apparent in light of this disclosure. To this end, the correlation of the various functions shown in FIG. 9 to the specific components illustrated in FIG. 4 is not intended to imply any structural and/or use limitations. Rather other embodiments may include, for example, varying degrees of integration wherein multiple functionalities are effectively performed by one system. For example, in an alternative embodiment a single module can be used to perform all of the functions of method 900. Thus other embodiments may have fewer or more modules and/or sub-modules depending on the granularity of implementation. Numerous variations and alternative configurations will be apparent in light of this disclosure.

As illustrated in FIG. 9, in one embodiment, method 900 for distribution of video analysis tasks commences, at operation 910, by identifying video analysis (VA) tasks to be performed by a VA processing node. In some embodiments, the task list includes required VA tasks and optional VA tasks. The required VA tasks are bound to the processing node while the optional VA tasks may be transferred from the VA node to another VA node.

Next, at operation 920, an initial assignment of the VA tasks is made to the video processing nodes. The initial assignment includes a first subset of the VA tasks that are required to be performed by the assigned node and a second subset of the VA tasks that are permitted to be transferred from the assigned node to another of the video processing nodes. At operation 930, the workload of the video processing nodes is monitored. At operation 940, the assignments of the VA tasks to the assigned node may be updated based on the monitored workload.

Of course, in some embodiments, additional operations may be performed, as previously described in connection with the system. These additional operations may include, for example, generating the initial assignment of tasks based on a predictive model of the workload of the assigned node during a selected time period and/or based on a determination of the computational resources of the assigned node.

Example System

Figure 10:
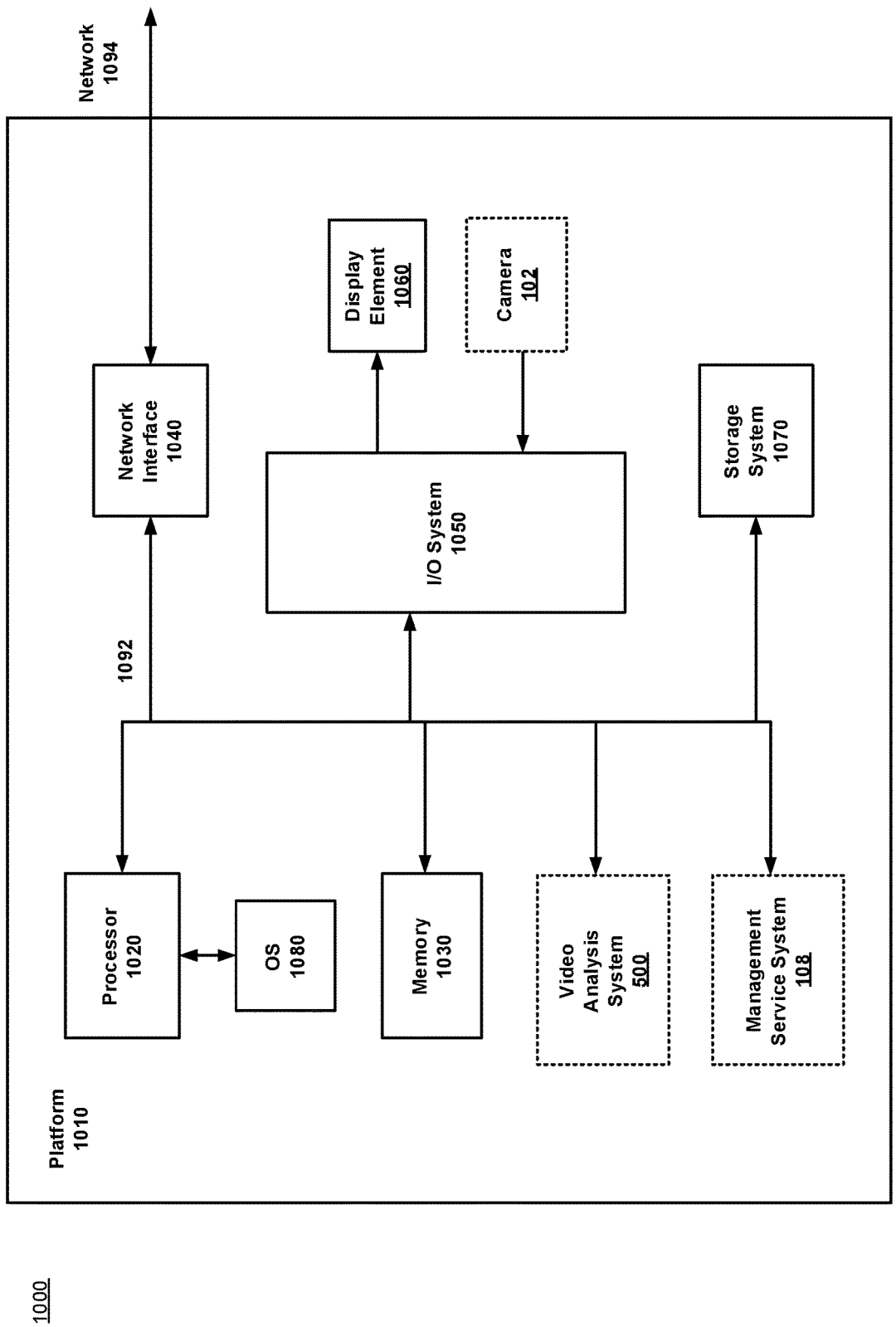
FIG. 10 is a block diagram schematically illustrating a system platform configured to perform video analysis, configured in accordance with certain of the embodiments disclosed herein.

FIG. 10 illustrates an example system 1000 that may be configured to distribute video analysis processing tasks for execution over a network of video processing nodes, as described herein. In some embodiments, system 1000 comprises a platform 1010 which may host, or otherwise be incorporated into an IP camera, a network video recorder, a data center computer system, a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), and so forth. Any combination of different devices may be used in certain embodiments.

In some embodiments, platform 1010 may comprise any combination of a processor 1020, a memory 1030, a network interface 1040, an input/output (I/O) system 1050, a display element 1060, and a storage system 1070. As can be further seen, a bus and/or interconnect 1092 is also provided to allow for communication between the various components listed above and/or other components not shown. Platform 1010 can be coupled to a network 1094 through network interface 1040 to allow for communications with other video processing nodes, computing devices, platforms or resources. In some embodiments, platform 1010 may be configured as one of the network video processing nodes and may include video analysis system 500, as described herein, and optionally camera 102 (in the case of an IP camera video processing node). In some embodiments, platform 1010 may be configured as a management service system and include the components of management service system 108, as described herein. Other componentry and functionality not reflected in the block diagram of FIG. 10 will be apparent in light of this disclosure, and it will be appreciated that other embodiments are not limited to any particular hardware configuration.

Processor 1020 can be any suitable processor, and may include one or more coprocessors or controllers, such as an audio processor or a graphics processing unit, to assist in control and processing operations associated with system 1000. In some embodiments, the processor 1020 may be implemented as any number of processor cores. The processor (or processor cores) may be any type or combination of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1020 may be implemented as a complex instruction set computer (CISC) or a reduced instruction set computer (RISC) processor. In some embodiments, processor 1020 may be configured as an x86 instruction set compatible processor.

Memory 1030 can be implemented using any suitable type of digital storage including, for example, flash memory and/or random access memory (RAM). In some embodiments, the memory 1030 may include various layers of memory hierarchy and/or memory caches as are known to those of skill in the art. Memory 1030 may be implemented as a volatile memory device such as, but not limited to, a RAM, dynamic RAM (DRAM), or static RAM (SRAM) device. Storage system 1070 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1070 may comprise technology to increase the storage performance enhanced protection for valuable digital media when multiple hard drives are included.

Processor 1020 may be configured to execute an Operating System (OS) 1080 which may comprise any suitable operating system, such as Google Android (Google Inc., Mountain View, Calif.), Microsoft Windows (Microsoft Corp., Redmond, Wash.), Linux, or Apple OS X (Apple Inc., Cupertino, Calif.) and/or various real-time operating systems. As will be appreciated in light of this disclosure, the techniques provided herein can be implemented without regard to the particular operating system provided in conjunction with system 1000, and therefore may also be implemented using any suitable existing or subsequently-developed platform.

Network interface module 1040 can be any appropriate network chip or chipset which allows for wired and/or wireless connection between other components of computer system 1000 and/or network 1094, thereby enabling system 1000 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1050 may be configured to interface between various I/O devices and other components of computer system 1000. I/O devices may include, but not be limited to, a display element 1060, a camera 102, and other devices not shown such as a keyboard, mouse, speaker, microphone, etc.

I/O system 1050 may include a graphics subsystem configured to perform processing of images for display element 1060. Graphics subsystem may be a graphics processing unit or a visual processing unit (VPU), for example. An analog or digital interface may be used to communicatively couple graphics subsystem and display element 1060. For example, the interface may be any of a high definition multimedia interface (HDMI), DisplayPort, wireless HDMI, and/or any other suitable interface using wireless high definition compliant techniques. In some embodiment, the graphics subsystem could be integrated into processor 1020 or any chipset of platform 1010. In some embodiments, display element 1060 may comprise any television type monitor or display, including liquid crystal displays (LCDs) and light emitting diode displays (LEDs). Display element 1060 may comprise, for example, a computer display screen, touchscreen display, video monitor, television-like device, and/or a television. Display element 1060 may be digital and/or analog. Under the control of the OS 1080 (or one or more software applications), platform 1010 may display processed images on display element 1060. The images may be provided by video analysis system 500, camera 102, management service system 108 or other sources.

It will be appreciated that in some embodiments, the various components of the system 1000 may be combined or integrated in a system-on-a-chip (SoC) architecture. In some embodiments, the components may be hardware components, firmware components, software components or any suitable combination of hardware, firmware or software.

Management service system 108 is configured to assign video analysis tasks to video processing nodes based on the node resources and predictive modelling of the node workload, and to re-distribute the tasks based on performance monitoring, as described herein. Video analysis system 500 is configured to execute or transfer the tasks based on a check of resource usage against a usage policy, as described herein. Management service system 108 and video analysis system 500 may include any or all of the components illustrated in FIGS. 4 and 5 and described above. Management service system 108 and video analysis system 500 can be implemented or otherwise used in conjunction with a variety of suitable software and/or hardware that is coupled to or that otherwise forms a part of system 1000. Management service system 108 and video analysis system 500 can additionally or alternatively be implemented or otherwise used in conjunction with user I/O devices that are capable of providing information to, and receiving information and commands from, a user. These I/O devices may include display element 1060, a textual input device such as a keyboard, and a pointer-based input device such as a mouse. Other input/output devices that may be used in other embodiments include a touchscreen, a touchpad, a speaker, and/or a microphone. Still other input/output devices can be used in other embodiments.

In some embodiments management service system 108 and/or video analysis system 500 may be installed local to system 1000, as shown in the example embodiment of FIG. 10. Alternatively, system 1000 can be implemented in a client-server arrangement (or local and cloud based arrangement) wherein at least some functionality is provided to system 1000 using an applet, such as a JavaScript applet, or other downloadable module. Such a remotely accessible module or sub-module can be provisioned in real-time in response to a request from a client computing system for access to a given server having resources that are of interest to the user of the client computing system. In such embodiments the server can be local to network 1094 or remotely coupled to network 1094 by one or more other networks and/or communication channels. In some cases access to resources on a given network or computing system may require credentials such as usernames, passwords, and/or compliance with any other suitable security mechanism.

In various embodiments, system 1000 may be implemented as a wireless system, a wired system, or a combination of both. When implemented as a wireless system, system 1000 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 1000 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example in one embodiment at least one non-transitory computer readable storage medium has instructions encoded thereon that, when executed by one or more processors, cause one or more of the methodologies for video analysis task distribution and execution, disclosed herein, to be implemented. The instructions can be encoded using a suitable programming language, such as C, C++, object oriented C, Java (e.g., on a Java Virtual Machine), JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, management service system 108 and video analysis system 500 may operate by leveraging processing resources provided by a remote computer system accessible via network 1094. In other embodiments the functionalities disclosed herein can be incorporated into other software applications, such as image management applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 1000 may comprise additional, fewer, or alternative sub-components as compared to those included in the example embodiment of FIG. 10.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for video analysis. The method comprises: receiving, by a processor, a video analysis (VA) task list at a first VA processing node, the task list comprising required VA tasks and optional VA tasks; performing, by the processor, the required VA tasks; checking, by the processor, resource usage of the first VA processing node against a usage policy, the usage policy to specify one or more resource usage thresholds for determination of further VA task processing; performing, by the processor, one or more of the optional VA tasks based on the resource usage check; and transferring, by the processor, one or more of the optional VA tasks to a second VA processing node based on the resource usage check.

Example 2 includes the subject matter of Example 1, wherein the resource usage comprises at least one of processor utilization of the first VA processing node and memory consumption of the first VA processing node.

Example 3 includes the subject matter of Examples 1 or 2, wherein the checking resource usage further comprises: comparing the resource usage to a first threshold value associated with triggering the transfer of the optional VA tasks; and comparing the resource usage to a second threshold value associated with ending the transfer of the optional VA tasks.

Example 4 includes the subject matter of any of Examples 1-3, wherein the transferring further comprises generating a VA packet comprising image data, a VA completion status and a VA task result, for transmission to the second VA processing node.

Example 5 includes the subject matter of any of Examples 1-4, further comprising: transferring the VA packet using a Message Queuing Telemetry Transport (MQTT) networking protocol or including the VA packet in a Motion Picture Experts Group Transport Stream (MPEG-TS) video streaming format.

Example 6 includes the subject matter of any of Examples 1-5, wherein the VA packet further comprises a usage mode to specify a video analysis pipeline configured to perform VA tasks including one or more of video analysis to identify features of a vehicle or video analysis to identify features of a person.

Example 7 includes the subject matter of any of Examples 1-6, wherein the VA tasks comprise one or more of: detecting the presence of a vehicle; calculating speed of the vehicle; detecting a license plate on the vehicle; recognizing the license plate; classifying the type of the vehicle; recognizing the color of the vehicle; detecting a face of a driver of the vehicle; and recognizing the face of the driver.

Example 8 is a system for video analysis. The system comprises: a video analysis (VA) task processor, associated with a first VA processing node, to receive a VA task list comprising required VA tasks and optional VA tasks, and to perform the required VA tasks; a policy check circuit to check resource usage of the first VA processing node against a usage policy, the usage policy to specify one or more resource usage thresholds for determination of further VA task processing; and the VA task processor further to perform one or more of the optional VA tasks based on the resource usage check, and transfer one or more of the optional VA tasks to a second VA processing node based on the resource usage check.

Example 9 includes the subject matter of Example 8, wherein the resource usage comprises at least one of processor utilization of the first VA processing node and memory consumption of the first VA processing node.

Example 10 includes the subject matter of Examples 8 or 9, wherein the policy check circuit is further to compare the resource usage to a first threshold value associated with triggering the transfer of the optional VA tasks; and compare the resource usage to a second threshold value associated with ending the transfer of the optional VA tasks.

Example 11 includes the subject matter of any of Examples 8-10, wherein the VA task processor is further to generate a VA packet comprising image data, a VA completion status and a VA task result, for transmission to the second VA processing node.

Example 12 includes the subject matter of any of Examples 8-11, wherein the VA task processor is further to transfer the VA packet using a Message Queuing Telemetry Transport (MQTT) networking protocol or to include the VA packet in a Motion Picture Experts Group Transport Stream (MPEG-TS) video streaming format.

Example 13 includes the subject matter of any of Examples 8-12, wherein the VA packet further comprises a usage mode to specify a video analysis pipeline configured to perform VA tasks including one or more of video analysis to identify features of a vehicle or video analysis to identify features of a person.

Example 14 includes the subject matter of any of Examples 8-13, wherein the VA tasks comprise one or more of: detecting the presence of a vehicle; calculating speed of the vehicle; detecting a license plate on the vehicle; recognizing the license plate; classifying the type of the vehicle; recognizing the color of the vehicle; detecting a face of a driver of the vehicle; and recognizing the face of the driver.

Example 15 is a method for distribution of video analysis tasks. The method comprises: identifying, by a processor, one or more video analysis (VA) tasks to be performed by a plurality of video processing nodes; generating, by the processor, an initial assignment of the VA tasks to an assigned node of the video processing nodes, the initial assignment comprising a first subset of the VA tasks that are required to be performed by the assigned node and a second subset of the VA tasks that are permitted to be transferred from the assigned node to another of the video processing nodes; monitoring, by the processor, workload of at least one of the video processing nodes; and updating, by the processor, the assignments of the VA tasks to the assigned node based on the monitored workload.

Example 16 includes the subject matter of Example 15, wherein the generation of the initial assignment is based on a predictive model of the workload of the assigned node during a selected time period, the predictive model based on an environment of the assigned node.

Example 17 includes the subject matter of Examples 15 or 16, wherein the generation of the initial assignment is based on a determination of the computational resources of the assigned node.

Example 18 includes the subject matter of any of Examples 15-17, wherein the video processing nodes are nodes of a network and each of the nodes is one of an Internet Protocol (IP) camera, a Video Recorder or a Data Center.

Example 19 includes the subject matter of any of Examples 15-18, wherein the VA tasks comprise one or more of: detecting the presence of a vehicle; calculating speed of the vehicle; detecting a license plate on the vehicle; recognizing the license plate; classifying the type of the vehicle; recognizing the color of the vehicle; detecting a face of a driver of the vehicle; and recognizing the face of the driver.

Example 20 is a system for distribution of video analysis tasks. The system comprises: a video analysis (VA) task static distribution circuit to: identify one or more VA tasks to be performed by video processing nodes; and generate an initial assignment of the VA tasks to an assigned node of the video processing nodes, the initial assignment comprising a first subset of the VA tasks that are required to be performed by the assigned node and a second subset of the VA tasks that are permitted to be transferred from the assigned node to another of the video processing nodes; a node workload measurement circuit to monitor workload of the video processing nodes; and a VA task dynamic re-distribution circuit to update the assignments of the VA tasks to the assigned node based on the monitored workload.

Example 21 includes the subject matter of Example 20, further comprising an environment modelling circuit to predict the workload of the assigned node during a selected time period based on an environment of the assigned node, wherein the generation of the initial assignment is based on the predicted workload.

Example 22 includes the subject matter of Examples 20 or 21, further comprising a node capability acquisition circuit to determine the computational resources of the assigned node, wherein the generation of the initial assignment is based on the determined computational resources.

Example 23 includes the subject matter of any of Examples 20-22, wherein the video processing nodes are nodes of a network and each of the nodes is one of an Internet Protocol (IP) camera, a Video Recorder or a Data Center.

Example 24 includes the subject matter of any of Examples 20-23, wherein the VA tasks comprise one or more of: detecting the presence of a vehicle; calculating speed of the vehicle; detecting a license plate on the vehicle; recognizing the license plate; classifying the type of the vehicle;

recognizing the color of the vehicle; detecting a face of a driver of the vehicle; and recognizing the face of the driver.

Example 25 is at least one non-transitory computer readable storage medium having instructions encoded thereon that, when executed by one or more processors, result in the following operations for video analysis. The operations comprise: receiving a video analysis (VA) task list at a first VA processing node, the task list comprising required VA tasks and optional VA tasks; performing the required VA tasks; checking resource usage of the first VA processing node against a usage policy, the usage policy to specify one or more resource usage thresholds for determination of further VA task processing; performing one or more of the optional VA tasks based on the resource usage check; and transferring one or more of the optional VA tasks to a second VA processing node based on the resource usage check.

Example 26 includes the subject matter of Example 25, wherein the resource usage comprises at least one of processor utilization of the first VA processing node and memory consumption of the first VA processing node.

Example 27 includes the subject matter of Examples 25 or 26, wherein the checking resource usage further comprises: comparing the resource usage to a first threshold value associated with triggering the transfer of the optional VA tasks; and comparing the resource usage to a second threshold value associated with ending the transfer of the optional VA tasks.

Example 28 includes the subject matter of any of Examples 25-27, wherein the transferring further comprises generating a VA packet comprising image data, a VA completion status and a VA task result, for transmission to the second VA processing node.

Example 29 includes the subject matter of any of Examples 25-28, further comprising: transferring the VA packet using a Message Queuing Telemetry Transport (MQTT) networking protocol or including the VA packet in a Motion Picture Experts Group Transport Stream (MPEG-TS) video streaming format.

Example 30 includes the subject matter of any of Examples 25-29, wherein the VA packet further comprises a usage mode to specify a video analysis pipeline configured to perform VA tasks including one or more of video analysis to identify features of a vehicle or video analysis to identify features of a person.

Example 31 includes the subject matter of any of Examples 25-30, wherein the VA tasks comprise one or more of: detecting the presence of a vehicle; calculating speed of the vehicle; detecting a license plate on the vehicle; recognizing the license plate; classifying the type of the vehicle; recognizing the color of the vehicle; detecting a face of a driver of the vehicle; and recognizing the face of the driver.

Example 32 is at least one non-transitory computer readable storage medium having instructions encoded thereon that, when executed by one or more processors, result in the following operations for distribution of video analysis tasks. The operations comprise: identifying one or more video analysis (VA) tasks to be performed by a plurality of video processing nodes; generating an initial assignment of the VA tasks to an assigned node of the video processing nodes, the initial assignment comprising a first subset of the VA tasks that are required to be performed by the assigned node and a second subset of the VA tasks that are permitted to be transferred from the assigned node to another of the video processing nodes; monitoring workload of at least one of the video processing nodes; and updating the assignments of the VA tasks to the assigned node based on the monitored workload.

Example 33 includes the subject matter of Example 32, wherein the generation of the initial assignment is based on a predictive model of the workload of the assigned node during a selected time period, the predictive model based on an environment of the assigned node.

Example 34 includes the subject matter of Examples 32 or 33, wherein the generation of the initial assignment is based on a determination of the computational resources of the assigned node.

Example 35 includes the subject matter of any of Examples 32-34, wherein the video processing nodes are nodes of a network and each of the nodes is one of an Internet Protocol (IP) camera, a Video Recorder or a Data Center.

Example 36 includes the subject matter of any of Examples 32-35, wherein the VA tasks comprise one or more of: detecting the presence of a vehicle; calculating speed of the vehicle; detecting a license plate on the vehicle; recognizing the license plate; classifying the type of the vehicle; recognizing the color of the vehicle; detecting a face of a driver of the vehicle; and recognizing the face of the driver.

Example 37 is a system for video analysis The system comprises: means for receiving a video analysis (VA) task list at a first VA processing node, the task list comprising required VA tasks and optional VA tasks; means for performing the required VA tasks; means for checking resource usage of the first VA processing node against a usage policy, the usage policy to specify one or more resource usage thresholds for determination of further VA task processing; means for performing one or more of the optional VA tasks based on the resource usage check; and means for transferring one or more of the optional VA tasks to a second VA processing node based on the resource usage check.

Example 38 includes the subject matter of Example 37, wherein the resource usage comprises at least one of processor utilization of the first VA processing node and memory consumption of the first VA processing node.

Example 39 includes the subject matter of Examples 37 or 38, wherein the checking resource usage further comprises: means for comparing the resource usage to a first threshold value associated with triggering the transfer of the optional VA tasks; and means for comparing the resource usage to a second threshold value associated with ending the transfer of the optional VA tasks.

Example 40 includes the subject matter of any of Examples 37-39, wherein the transferring further comprises means for generating a VA packet comprising image data, a VA completion status and a VA task result, for transmission to the second VA processing node.

Example 41 includes the subject matter of any of Examples 37-40, further comprising: means for transferring the VA packet using a Message Queuing Telemetry Transport (MQTT) networking protocol or including the VA packet in a Motion Picture Experts Group Transport Stream (MPEG-TS) video streaming format.

Example 42 includes the subject matter of any of Examples 37-41, wherein the VA packet further comprises a usage mode to specify a video analysis pipeline configured to perform VA tasks including one or more of video analysis to identify features of a vehicle or video analysis to identify features of a person.

Example 43 includes the subject matter of any of Examples 37-42, wherein the VA tasks comprise one or more of: detecting the presence of a vehicle; calculating speed of the vehicle; detecting a license plate on the vehicle; recognizing the license plate; classifying the type of the vehicle;

recognizing the color of the vehicle; detecting a face of a driver of the vehicle; and recognizing the face of the driver.

Example 44 is a system for distribution of video analysis tasks. The system comprises: means for identifying one or more video analysis (VA) tasks to be performed by a plurality of video processing nodes; means for generating an initial assignment of the VA tasks to an assigned node of the video processing nodes, the initial assignment comprising a first subset of the VA tasks that are required to be performed by the assigned node and a second subset of the VA tasks that are permitted to be transferred from the assigned node to another of the video processing nodes; means for monitoring workload of at least one of the video processing nodes; and means for updating the assignments of the VA tasks to the assigned node based on the monitored workload.

Example 45 includes the subject matter of Example 44, wherein the generation of the initial assignment is based on a predictive model of the workload of the assigned node during a selected time period, the predictive model based on an environment of the assigned node.

Example 46 includes the subject matter of Examples 44 or 45, wherein the generation of the initial assignment is based on a determination of the computational resources of the assigned node.

Example 47 includes the subject matter of any of Examples 44-46, wherein the video processing nodes are nodes of a network and each of the nodes is one of an Internet Protocol (IP) camera, a Video Recorder or a Data Center.

Example 48 includes the subject matter of any of Examples 44-47, wherein the VA tasks comprise one or more of: detecting the presence of a vehicle; calculating speed of the vehicle; detecting a license plate on the vehicle; recognizing the license plate; classifying the type of the vehicle; recognizing the color of the vehicle; detecting a face of a driver of the vehicle; and recognizing the face of the driver.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A computer program product including at least one non-transitory computer readable storage medium having instructions encoded thereon that, when executed by one or more processors, cause a process to be carried out for video analysis, the process comprising:
   receiving a video analysis (VA) task list at a first VA processing node, the task list comprising one or more designated required VA tasks and one or more designated optional VA tasks;
   checking resource usage of the first VA processing node against a usage policy, the usage policy to specify one or more resource usage thresholds for determination of further VA task processing; and
   transferring one or more of the one or more designated optional VA tasks to a second VA processing node based on the resource usage check, wherein the transferring comprises generating a VA packet for transmission to the second VA processing node, the VA packet comprising a usage mode to specify a video analysis pipeline that includes the first and second VA processing nodes, the video analysis pipeline configured to perform VA tasks including video analysis to identify features of a vehicle and/or video analysis to identify features of a person.

2. The computer program product of claim 1, wherein the resource usage comprises at least one of processor utilization of the first VA processing node and memory consumption of the first VA processing node.

3. The computer program product of claim 1, wherein the checking resource usage further comprises: comparing the resource usage to a first threshold value associated with triggering the transfer of the one or more designated optional VA tasks; and comparing the resource usage to a second threshold value associated with ending the transfer of the one or more designated optional VA tasks.

4. The computer program product of claim 1, wherein the VA packet further comprises image data, a VA completion status, and a VA task result.

5. The computer program product of claim 1, wherein transferring the VA packet comprises using a Message Queuing Telemetry Transport (MQTT) networking protocol or including the VA packet in a Motion Picture Experts Group Transport Stream (MPEG-TS) video streaming format.

6. The computer program product of claim 1, wherein the VA task list comprises VA tasks comprising one or more of: detecting the presence of the vehicle; calculating speed of the vehicle; detecting a license plate on the vehicle; recognizing the license plate; classifying the type of the vehicle; recognizing the color of the vehicle; detecting a face of a driver of the vehicle; and/or recognizing the face of the driver.

7. The computer program product of claim 1, further comprising performing the one or more designated required VA tasks at the first VA processing node and performing one or more of the one or more designated optional VA tasks based on the resource usage check.

8. A system for video analysis, the system comprising:
   a video analysis (VA) task processor, associated with a first VA processing node, and configured to receive a VA task list comprising one or more designated required VA tasks and one or more designated optional VA tasks;
   a policy check circuit configured to check resource usage of the first VA processing node against a usage policy, the usage policy to specify one or more resource usage thresholds for determination of further VA task processing; and
   the VA task processor further configured to transfer one or more of the one or more designated optional VA tasks to a second VA processing node based on the resource usage check, wherein the transferring comprises generating a VA packet for transmission to the second VA processing node, the VA packet comprising a usage mode to specify a video analysis pipeline configured to perform VA tasks including video analysis to identify features of a vehicle and/or video analysis to identify features of a person.

9. The system of claim 8, wherein:
the resource usage comprises at least one of processor utilization of the first VA processing node and memory consumption of the first VA processing node;
the policy check circuit is further configured to compare the resource usage to a first threshold value associated with triggering the transfer of the one or more designated optional VA tasks; and compare the resource usage to a second threshold value associated with ending the transfer of the one or more designated optional VA tasks; and
the VA task processor is further configured to generate a VA packet comprising image data, a VA completion status and a VA task result.

10. The system of claim 8, wherein the VA task processor is further configured to transfer the VA packet using a Message Queuing Telemetry Transport (MQTT) networking protocol or to include the VA packet in a Motion Picture Experts Group Transport Stream (MPEG-TS) video streaming format.

11. The system of claim 8, wherein the VA task list comprises VA tasks comprising one or more of: detecting the presence of the vehicle; calculating speed of the vehicle; detecting a license plate on the vehicle; recognizing the license plate; classifying the type of the vehicle; recognizing the color of the vehicle; detecting a face of a driver of the vehicle; and/or recognizing the face of the driver.

12. The system of claim 8, wherein the VA task processor is further configured to perform the one or more designated required VA tasks and perform one or more of the one or more designated optional VA tasks based on the resource usage check.

13. A computer program product including at least one non-transitory computer readable storage medium having instructions encoded thereon that, when executed by one or more processors, cause a process to be carried out for distribution of video analysis tasks, the process comprising:
identifying one or more video analysis (VA) tasks to be performed by a plurality of video processing nodes;
generating an initial assignment of the VA tasks to an assigned node of the video processing nodes, the initial assignment comprising a first subset of the VA tasks that are designated as required to be performed by the assigned node and a second subset of the VA tasks that are designated as permitted to be transferred from the assigned node to another of the video processing nodes, wherein the transferring comprises generating, by the assigned node, a VA packet for transmission to the other of the video processing nodes, the VA packet comprising a usage mode to specify a video analysis pipeline that includes the assigned node and the other of the video processing nodes, the video analysis pipeline configured to perform VA tasks including video analysis to identify features of a vehicle and/or video analysis to identify features of a person;
monitoring workload of at least one of the video processing nodes; and
updating the assignments of the VA tasks to the assigned node based on the monitored workload.

14. The computer program product of claim 13, wherein the generation of the initial assignment is based on a predictive model of the workload of the assigned node during a selected time period, the predictive model based on an environment of the assigned node.

15. The computer program product of claim 13, wherein the generation of the initial assignment is based on a determination of the computational resources of the assigned node.

16. The computer program product of claim 13, wherein the video processing nodes are nodes of a network and each of the nodes includes an Internet Protocol (IP) camera, a Video Recorder, or a Data Center.

17. The computer program product of claim 13, wherein the VA tasks comprise one or more of: detecting the presence of the vehicle; calculating speed of the vehicle; detecting a license plate on the vehicle; recognizing the license plate; classifying the type of the vehicle; recognizing the color of the vehicle; detecting a face of a driver of the vehicle; and/or recognizing the face of the driver.

18. A system for distribution of video analysis tasks, the system comprising:
a video analysis (VA) task static distribution circuit configured to:
identify one or more VA tasks to be performed by video processing nodes; and
generate an initial assignment of the VA tasks to an assigned node of the video processing nodes, the initial assignment comprising a first subset of the VA tasks that are designated as required to be performed by the assigned node and a second subset of the VA tasks that are designated as permitted to be transferred from the assigned node to another of the video processing nodes, wherein the transferring comprises generating, by the assigned node, a VA packet for transmission to the other of the video processing nodes, the VA packet comprising a usage mode to specify a video analysis pipeline that includes the assigned node and the other of the video processing nodes, the video analysis pipeline configured to perform VA tasks including video analysis to identify features of a vehicle and/or video analysis to identify features of a person;
a node workload measurement circuit configured to monitor workload of the video processing nodes; and
a VA task dynamic re-distribution circuit configured to update the assignments of the VA tasks to the assigned node based on the monitored workload.

19. The system of claim 18, further comprising:
an environment modelling circuit configured to predict the workload of the assigned node during a selected time period based on an environment of the assigned node, wherein the generation of the initial assignment is based on the predicted workload; and
a node capability acquisition circuit configured to determine the computational resources of the assigned node, wherein the generation of the initial assignment is based on the determined computational resources.

20. The system of claim 18, wherein:
the video processing nodes are nodes of a network and each of the nodes includes an Internet Protocol (IP) camera, a Video Recorder, or a Data Center; and
the VA tasks comprise one or more of: detecting the presence of the vehicle; calculating speed of the vehicle; detecting a license plate on the vehicle; recognizing the license plate; classifying the type of the vehicle; recognizing the color of the vehicle; detecting a face of a driver of the vehicle; and/or recognizing the face of the driver.

* * * * *